(12) United States Patent
Reid

(10) Patent No.: US 7,248,968 B2
(45) Date of Patent: Jul. 24, 2007

(54) OBSTACLE DETECTION USING STEREO VISION

(75) Inventor: John Franklin Reid, Moline, IL (US)

(73) Assignee: Deere & Company, Moline, IL (US)

( * ) Notice: Subject to any disclaimer, the term of this patent is extended or adjusted under 35 U.S.C. 154(b) by 227 days.

(21) Appl. No.: 10/977,675

(22) Filed: Oct. 29, 2004

(65) Prior Publication Data

US 2006/0095207 A1 May 4, 2006

(51) Int. Cl.
*G06K 9/20* (2006.01)
*G05B 13/00* (2006.01)

(52) U.S. Cl. .................. 701/301; 701/116; 340/435

(58) Field of Classification Search ............ 701/301, 701/116, 117; 340/435, 436, 901, 903, 461, 340/438, 439, 462; 348/118, 148
See application file for complete search history.

(56) References Cited

U.S. PATENT DOCUMENTS

| | | | | |
|---|---|---|---|---|
| 3,946,825 | A | 3/1976 | Gail | 180/79.2 |
| 5,555,175 | A * | 9/1996 | D'orso | 701/5 |
| 5,610,815 | A | 3/1997 | Gudat et al. | 364/424.027 |
| 5,612,883 | A | 3/1997 | Shaffer et al. | 364/460 |
| 5,661,817 | A * | 8/1997 | Hatlestad et al. | 382/110 |
| 5,949,331 | A * | 9/1999 | Schofield et al. | 340/461 |
| 6,226,389 | B1 * | 5/2001 | Lemelson et al. | 382/104 |
| 6,278,918 | B1 | 8/2001 | Dickson et al. | 701/23 |
| 6,336,051 | B1 * | 1/2002 | Pangels et al. | 700/50 |
| 6,385,515 | B1 | 5/2002 | Dickson et al. | 701/28 |
| 6,445,983 | B1 | 9/2002 | Dickson et al. | 701/23 |
| 6,661,449 | B1 | 12/2003 | Sogawa | 348/113 |
| 2004/0252864 | A1 * | 12/2004 | Chang et al. | 382/104 |
| 2005/0004762 | A1 * | 1/2005 | Takahama et al. | 701/301 |

FOREIGN PATENT DOCUMENTS

| | | |
|---|---|---|
| DE | 199 26 559 A1 | 12/2000 |
| EP | 0 686 942 A2 | 12/1995 |
| EP | 0 887 660 A2 | 12/1998 |
| WO | WO 96/17279 | 6/1996 |
| WO | 98/46065 | 10/1998 |

OTHER PUBLICATIONS

Author: Francisco Rovira Ma's; Title: Applications of Stereoscopic Vision to Agriculture; Thesis 2003, University of Illinois.
Author: Huei-Yung Lin; Title: Computer Vision Techniques for Complete 3D Model Reconstruction; May 2002, State University of New York at Stony Brook.

(Continued)

*Primary Examiner*—Dalena Tran

(57) ABSTRACT

A system and method for detecting an obstacle comprises determining a vegetation height of a vegetation canopy at corresponding coordinates within a field. An object height is detected, where the object height of an object exceeds the vegetation height. A range of the object is estimated. The range of the object may be references to a vehicle location, a reference location, or absolute coordinates. Dimensions associated with the object are estimated. An obstacle avoidance zone is established for the vehicle based on the estimated range and dimensions.

28 Claims, 9 Drawing Sheets
(2 of 9 Drawing Sheet(s) Filed in Color)

OTHER PUBLICATIONS

Author(s): Chun-Jen Tsai and Aggelos K. Katsaggelos; Title: Dense Disparity Estimation with a Divide-and-Conquer Disparity Space Image Technique—1998 Northwestern University.

Author(s): Tom Pilarski, Mike Happold, Henning Pangels, Mark Ollis, Kerien Fitzpatrick and Anthoy Stentz; Title: The Demeter System for Automated Harvesting; Carnegie Mellon University.

* cited by examiner

US 7,248,968 B2

OBSTACLE DETECTION USING STEREO VISION

FIELD OF THE INVENTION

This application relates to a system and method for obstacle detection using stereo vision.

BACKGROUND OF THE INVENTION

Monocular machine vision may offer limited capability in supporting obstacle detection for vehicles. An obstacle may be detected by identifying a monocular image feature that violates expected scene information. For example, monocular vision data may be used to potentially identify objects in a field that do not meet a soil image profile or a plant image profile as an obstacle. However, monocular vision data may be deficient in providing reliable identification of obstacles based on size, shape, depth, and other three dimensional geometric characteristics. Monocular machine vision tends to be over-inclusive or under-inclusive in obstacle identification because of the absence of three-dimensional data on the size and shape of a perceived obstacle. Further, the collection of monocular vision data is susceptible to distortion or inaccuracy arising from variations in illumination across a field of view. Although three-dimensional shape data of an object may be collected via a laser range finder that scans the surface of the object, the process may be too slow to be practical for vehicular navigation. Thus, there is need for an obstacle detection method and system that uses stereo vision to reliably identify obstacles.

SUMMARY OF THE INVENTION

In accordance with one aspect of the invention, a system and method for detecting an obstacle comprises determining a vegetation height of a vegetation canopy at corresponding coordinates within a field. An object height is detected, where the object height of an object exceeds the vegetation height. A range of the object is estimated. The range of the object may be referenced to a vehicle location, a reference location, or absolute coordinates. Dimensions associated with the object are estimated. An obstacle avoidance zone is established for the vehicle based on the estimated range and dimensions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers in different drawings indicate like elements, steps or procedures.

DESCRIPTION OF THE PREFERRED EMBODIMENT

Figure 1:
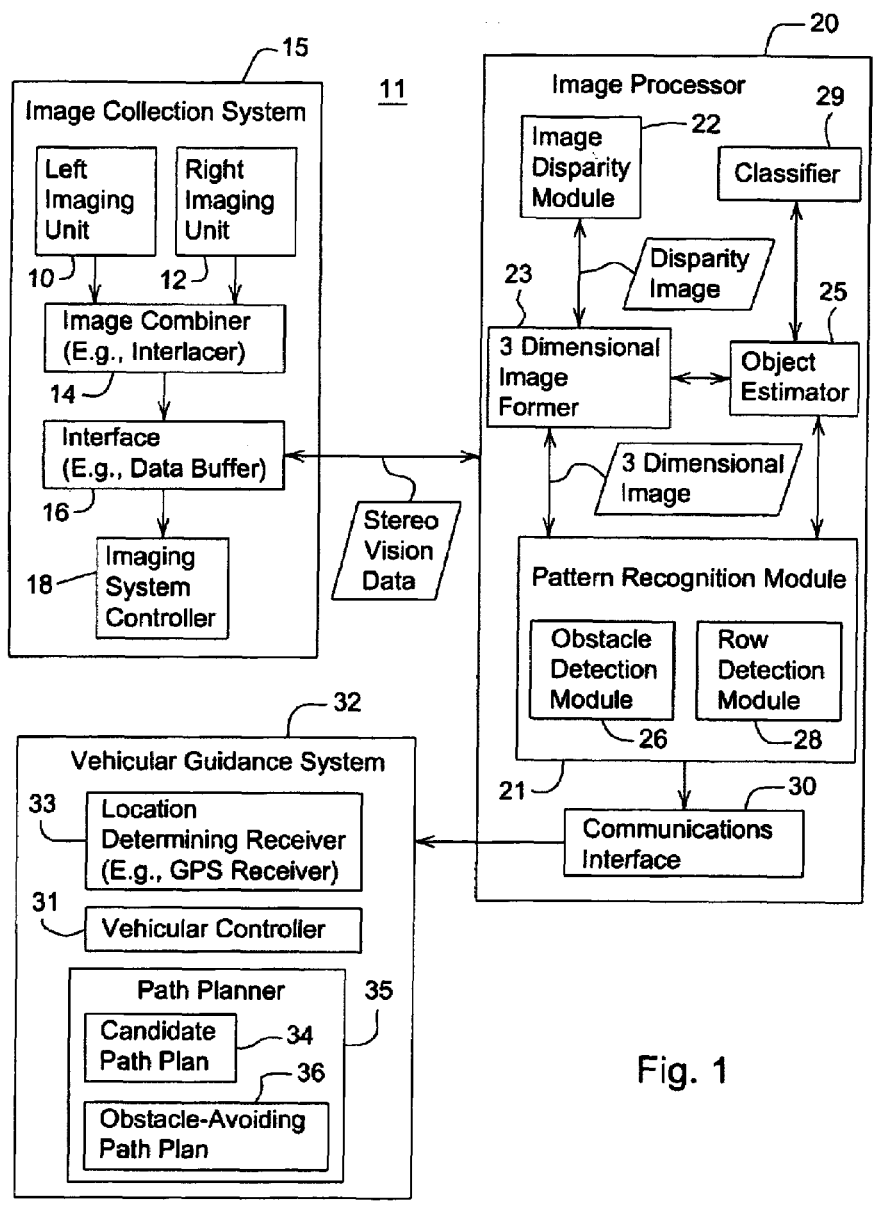
FIG. 1 is a block diagram of a system for obstacle detection using stereo vision in accordance with the invention.

In accordance with one embodiment, FIG. 1 illustrates a detection system 11 for detecting an obstacle in a field of view around a vehicle. The detection system 11 comprises an image collection system 15 coupled to an image processor 20. In turn, the image processor 20 is coupled to a vehicular guidance system 32.

Image Collection System

The image collection system 15 comprises a left imaging unit 10 and a right imaging unit 12 that are coupled to an image combiner 14 (e.g., an interlacer). The image combiner 14 may be coupled to an interface 16. The interface 16 provides a communications interface (or a data buffer) for the stereo vision data transmitted from the image collection system to the image processor 20. An imaging system controller 18 may control the optical characteristics of the left imaging unit 10, the right imaging unit 12, or the format of stereo vision data or image data outputted by the interface 16, for example.

The optical characteristics of the imaging units (10, 12) may include any of the following: the aperture of one or both imaging units (10,12), the effective or actual focal length of one or both imaging units (10,12), lens parameters of one or both imaging units (10,12), the sensitivity to luminance and frequency response of one or both imaging units or their components (e.g., charge coupled devices (CCD) or other detectors), resolution of one or both imaging units (10, 12) (e.g., expressed as number of pixels per image or pixel dimensions) and filtering of the output of one or both imaging units (10,12) for noise, optical distortion, chrominance distortion, luminance distortion, or for lighting variations (e.g., shade versus sunlight). The frequency response of one or both imaging units (10,12) may support the collection of images in the following frequency spectrum of the electromagnetic spectrum: humanly visible light, a portion of the visible light spectrum (e.g., red light spectrum, green light spectrum and blue light spectrum or other color portions of the humanly visible light spectrum), near-infrared frequency range, the infrared frequency range, and any combination of the foregoing frequency ranges.

The left imaging unit 10 and right imaging unit 12 gather a pair of raw stereo scene images of the object from spatially offset perspectives at a common time. The left imaging unit 10 and the right imaging unit 12 are offset by a fixed, known spatial amount, which may be referred to as the stereo baseline. The image combiner 14 combines the raw stereo scene images to produce composite image data or a composite data stream. For example, the composite data stream or stereo vision data may consist of alternating frames, alternating lines of frames, alternating words, bytes, bits, or data packets of left image data from the left imaging unit 10 and right image data from the right imaging unit 12. In one embodiment, the image combiner 14 comprises an interlacer that accepts an input of a left image data stream and a right image data stream and provides an output of an interlaced data stream that contains bytes from both the left image data stream and the right image data stream. The image collection system 15 supports synchronization of images collected from the left imaging unit 10 and the right imaging unit 12 such that images captured at the substantially the same time are associated with one another.

Image Processor

The image processor 20 comprises an image disparity module 22, a three dimensional image former 23, an object estimator 25, a pattern recognition module 21, and a communications interface 30. In one embodiment, the image disparity module 22 communicates with the three dimensional image former 23. In turn, the three dimensional image former 23 communicates with the object estimator 25, the pattern recognition module, 21, or both. The pattern recognition module 21 communicates with the communications interface 30. The communications interface 30 is an intermediary that manages communications between the image processor 20 and the vehicle guidance system 32.

In one embodiment, the image processor 20 facilitates the determination of a range of the object and the dimensions of an object. The image processor 20 is well suited for creating a three dimensional representation of the object or a scene based on the disparity map image and the stereo vision data.

The image disparity module 22 creates a disparity map image that represents disparity between the raw stereo scene images from the left imaging unit 10 and the right imaging unit 12. The three-dimensional image former 23 accepts an input of a disparity image or other stereo vision image data (e.g., interlaced data stream) of a scene (or object) and produces a three-dimensional representation of the scene (or object) as an output.

In one embodiment, the three dimensional image former 23 may create or form the three-dimensional image representation based on one or more of the following types of input data: the disparity image, raw left image data, and raw right image data, stereo vision data, and interlaced image data. The three-dimensional representation may comprise a constellation of data points that lie on the surface of the object (e.g., obstacle), a framework of planar patches or a grid that lie on the surface of the object, a rough block or cubic representation of the maximum dimensions of the obstacle, or another three-dimensional model of the object. The data points on the object, framework that models the object, or another three-dimensional model may be referenced to a position or location data for a moving or stationary vehicle, a stationary reference point, an absolute coordinate system, or otherwise.

The object estimator 25 may determine or estimate one or more of the following: (1) the range (depth 50) of the object from the image collection system 15 or with respect to the vehicle, (2) the three-dimensional dimensions of the object (e.g., width, depth and height), (3) two-dimensional dimensions of the object (e.g., width and length) and range to the object; (4) whether the object is stationary or moving, (5) velocity, acceleration, speed, or heading of the object relative to the vehicle or relative to a stationary reference point, and (6) an estimated center of mass or geometric center of the object. The range of the object may represent the distance between a surface point on the object and a reference point associated with the vehicle (e.g., a baseline of the imaging units (10, 12)).

In an alternative embodiment, the range of the object may represent the distance between a geometric center or center of mass of the object and the vehicle or a reference point associated therewith. In yet another alternate embodiment, the range of the object may represent the distance between the vehicle and some reference point that lies on or within the object.

The pattern recognition module 21 is associated with the object estimator 25 and the three dimensional image former 23. The pattern recognition module 21 may facilitate the identification of an object in a scene from stereo image data and the extraction of an object from background data within the stereo vision data based on one or more of the following: (1) color information (e.g., pixels or voxels) associated with the image, (2) luminance information (e.g., pixels or voxels) associated with the image, (3) three-dimensional shape data on the object, and (3) dimensions of the object. For example, an object may have a generally uniform color which is distinct from the background data or a particular luminance value of pixels that is distinct from the background data. A voxel refers to a volume pixel or pixel of a three-dimensional image.

The pattern recognition module 21 comprises an obstacle detection module 26 and row detection module 28. The obstacle detection module 26 detects an object height of an object that exceeds the vegetation height. The obstacle detection module 26 facilitates identification of one or more objects or obstacles within a scene, collected image data or collected stereo vision data. The row detection module 28 may facilitate identification of the positions of one or more rows of crops or cultivated plants within a field. In one embodiment, the row detection module 28 determines a vegetation height of a vegetation canopy at corresponding coordinates within a field.

For example, the obstacle detection module 26 may differentiate an object or obstacle from the background or remainder of an image by one or more of the following techniques: (1) comparing collected color parameters of pixels (or voxels) in an image or portion of an image to reference color parameters of pixels (or voxels) within one or more depth zones or a three-dimensional image, where the reference color parameters represent expected color parameters for an obstruction-free image, (2) comparing derivative collected data derived from collected color parameters to derivative reference data derived from the reference pixel color parameters, (3) comparing a detected image size to a reference object profile size (e.g., typical dimensions of animals, humans, trees, bushes, telephone poles, machines or vehicles) within one or more depth zones of a three-dimensional image. In one embodiment, to identify an object or obstacle in an image or scene around the vehicle, the obstacle detection module 26 may apply a data processing resources of the image processor 20 first to a candidate path plan of the vehicle and a safety clearance zone about the vehicle or such candidate path plan, and secondarily to the entire field of view of the image collection system 15.

The communications interface 30 communicates pattern recognition data, row location data, obstacle location data, obstacle avoidance data, object dimension data, and object range data to a vehicular guidance system 32.

Vehicular Guidance System

The vehicular guidance system 32 is associated with a location-determining receiver 33, a path planner 35, and a vehicular controller 31. The location determining receiver 33 may comprise a Global Positioning System Receiver (e.g., GPS receiver) with differential correction that provides location data (e.g., instantaneous or real time location data) of the vehicle in terms of coordinates or otherwise.

The path planner 35 may consider the crop rows or planned crop rows to develop a path plan for the vehicle. The path planner 35 updates a candidate path plan 34 to obtain an actual path plan or obstacle-avoiding path plan 36 based on the presence, location, velocity and bearing of objects around the vehicle to avoid collisions between the vehicle and the object. In one embodiment, a vehicular guidance system 32 or path planner 35 establishes an obstacle avoidance zone for the vehicle based on the estimated range and dimensions of the object. In another embodiment, the vehicular guidance system 32 or path planner establishes an obstacle avoidance zone based the on estimated range of the object, dimensions of the object, and movement of the object. In still another embodiment, the vehicular guidance system 32 or path planner establishes an obstacle avoidance zone based the on estimated range of the object, dimensions of the object, and a candidate path plan 34.

The vehicular controller 31 may be associated with a braking system, a steering system, and a propulsion system to control the acceleration, movement direction, stopping of a vehicle, or general driving of the vehicle.

In one embodiment, the vehicle is permitted to travel in travel rows between the crop rows in a candidate path plan 34. The candidate path plan 34 may be interrupted, stopped, or changed based on one or more of the following: obstacle avoidance zone, row location data, obstacle location data, object dimension data, and object range data. In one embodiment, the row alignment may be sacrificed to avoid striking or running over an object such that the actual path plan 36 or obstacle-avoiding path plan 36 differs from the candidate path plan 34.

Figure 2:
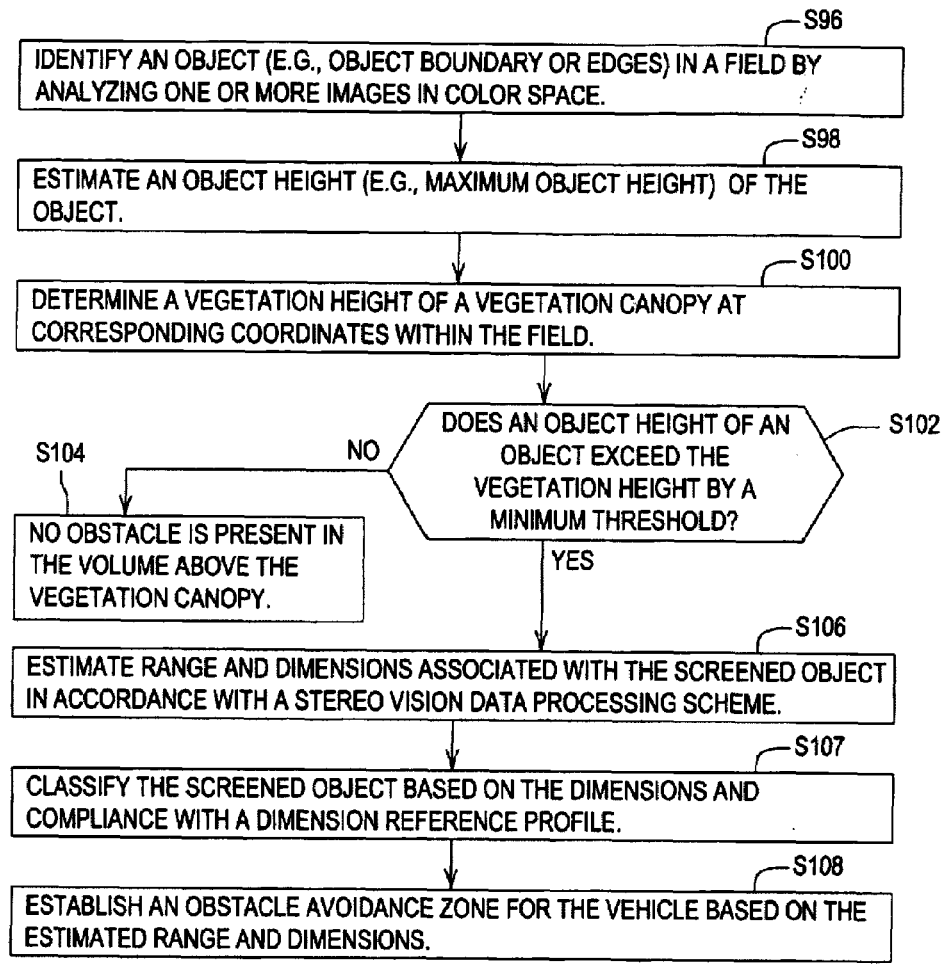
FIG. 2 is flow chart of one embodiment of a method for detecting an obstacle.

FIG. 2 is a method for detecting an obstacle in accordance with the invention. The method of FIG. 2 begins in step S96. Prior to step S96, the image collection system 15 collects one or more images (e.g., stereo vision data) of the field and makes the image or images available to the image processor 20.

In step S96, an image processor 20 or obstacle detection module 26 identifies an object in a field by analyzing one or more images in color space. The object is extracted from or distinguished from the background of the image in color space by applying one or more of the following techniques to the image or a portion of an image: color differentiation, color histogram analysis, probability density function analysis, and edge analysis in an image region within the boundaries of the object and immediately outside the boundaries of the object. In one embodiment, to differentiate obstacles from the background of the image or scene, the obstacle detection module 26 may apply a data processing resources of the image processor 20 first to a candidate path plan of the vehicle and a safety clearance zone about the vehicle or such candidate path plan, and secondarily to the entire field of view of the image collection system 15.

In step S96, a collected derivative data set of the collected image is compared to a reference derivative data set of a reference image. In one embodiment, the collected derivative data set may represent a probability density function or a color histogram analysis applied to a collected image or a portion thereof. For example, the reference derivative data set of a reference image is defined as a probability density function of color parameters (e.g., color, tone, hue, or intensity) or color histogram of color parameters derived from a reference image that may be collected from the obstacle-free portion of a field (or obstacle-free field) in question with a substantially similar color palette or presence of a particular crop (e.g., corn or soybeans) at a particular growth stage (e.g., early season, mid-season, or mature-harvest time) with defined illumination characteristics (e.g., full sun, partly cloudy, overcast). The particular crop type, growth stage, and defined illumination characteristics of the reference image are preferably substantially similar to those applicable to the subject field at the collection time of the images.

The reference image may be obtained in accordance with one or more techniques that may be applied individually or cumulatively. Under a first technique, a reference image is collected of the present subject field when the present subject field is in a known state that is free of all obstacles (e.g., people, animals and machines.) Under a second technique, a reference image is selected from a library of reference images based on one or more of the following: the type of crop, planting date of the crop, historic weather data, cloud cover data, illumination data, crop inputs, and geographic location or zone. For example, the reference derivative data set for a mid-season corn field may provide a substantially uniform color attributes to be used generically in many different fields.

In step S96, the image processor 20 or the obstacle detection module 26 determines differences or correlation between the collected derivative data set and the reference derivative data set to identify the presence of an object or obstacle in (pixels or voxels of) the collected image with one or more colors or color attributes that are sufficiently distinct from the obstacle-free image or obstacle-free portion of the field. Where a portion of the (pixels or voxels) of the collected image has colors that do not match or are not sufficiently correlated to the reference image, the object is identified as present. In one embodiment, the image processor 20 or obstacle detection module 26 identifies the outline, object boundary, or edges of the object by distinguishing the interior color of the object from the background or a material color transition between the boundary of the object and the background through comparisons of groups of pixels or voxels in the region of the image.

Advantageously, in step S96 the application of color differentiation, color probability density function, histogram and edge analysis may be completed rapidly to identify objects in a structured environment, such as a field (e.g., a corn field). In one embodiment, to reduce computational time and data processing resources, the image processor 20 or obstacle detection module 26 limits the analysis of step S96 to any of the following: (1) a particular region of depth of a three-dimensional image, (2) a two dimensional depth slice of uniform depth of three-dimensional image, (3) an image (e.g., a two-dimensional image) from one of the imaging units (19 or 12).

In step S98, an image processor 20 or object estimator 25 estimates object height of the object identified in step S96. For example, if step S96 provides an estimated outline of the object through a color differentiation technique, the image processor 20 or object estimator 25 determines a maximum height of the object through selective stereo processing in the region of the object for the extraction of three-dimensional depth data.

In step S98, the image processor 20 or the three-dimensional image former 23 may apply selective stereo image processing in a limited region of the object where the outline, boundary, or edges of the object has a maximum height or dimension along the y axis. The depth (d) of the object is estimated by correlation of common data points in the limited region of the object in a left image and a corresponding right image of a stereo image. Once the depth is available, real world y data for a generally linear vertical strip within the limited region of the outline, boundary or edges of the object may be computed by reference to either the right image or the left image. The real world y data provides an estimate the maximum height of the object. By processing only a limited region or generally linear vertical strip within the outline, boundary or edges of the object, the data processing resources are minimized and time reduced to practice the method of FIG. 2.

In an alternate procedure for carrying out step S98, the image processor 20 may use field-of-focus processing, instead of stereo vision techniques to estimate depth information or other three-dimensional information in a scene. Field-of-focus processing may be used to rapidly estimate a depth or three-dimensional location of the object. For example, an image processing unit (10 or 12) takes one or more images from the same location or approximately the same location with different focus or lens adjustment of the imaging unit (10 or 12) and the image processor 20 determines the real word depth of an object from the lens based on distance of the of the focused image of the object from the lens and the focal length of the lens associated with the imaging unit (10 or 12).

In step S100, a vegetation height or top surface of a vegetation canopy is determined at corresponding coordinates or locations within a field. For example, the image collection system 15 collects one or more images indicative of the vegetation height of the vegetation canopy at one or more locations throughout a field and the image processor 20 processes the collected image or images to determine the vegetation height. The top surface of the vegetation canopy refers to the generally planar or other area that intercepts vegetation heights at some or all locations throughout the field. The vegetation height may be clustered around a mean value for each field or soil growing zone within a field for a particular crop variety that is treated with the same crop inputs, for example. The mean value of the vegetation height may be extracted from as few as one image, or mean values of the vegetation height may derived from multiple images. In one embodiment, each mean value may be associated with corresponding coordinates or a location within a field.

In step S100 the image processor 20 determines a vegetation height or top surface of a vegetation canopy through one or more of the following techniques, which may be applied separately or cumulatively: (1) identifying a crop height at an edge of the field, (2) identifying a crop height at a transition edge between a harvested and unharvested crop (e.g., by fitting a step function to pixels of an image of the transition edge in color space (e.g., RGB space)), (3) identifying a crop height relative to one or more visual reference markers (e.g., optically readable yard sticks) with vertical measurements placed thereon and distributed throughout a field, (4) identifying a generally planar surface or a top surface parallel to the ground without registering the height of the elevated surface above the ground, (5) an operator measuring a vertical height of the top of the crop to the ground level at various corresponding test points (e.g., with coordinates of test points determined by Global Positioning System with differential correction) in a field, and (6) an operator entering a vegetation height range, a maximum vegetation height, or a minimum vegetation height based on the crop type or horticultural practices. For instance, corn may be limited to a minimum and maximum height based on a particular variety of the corn; soybeans may be limited to a certain minimum and maximum height based on particular variety of soybeans; grape vines, apples or other fruit crops may be limited in height by pruning, genetics, or other horticultural practices.

In any of the above techniques for executing step S100, the image processor 20 or pattern recognition module 21 may distinguish the vegetation canopy from surrounding soil, sky, horizon, background, or weeds, or other materials by a color parameter (e.g., shade of green and the variation thereof) of the vegetation canopy from (1) one image of a stereo image, (2) a monocular image, or (3) one or more stereo vision images. The detected color parameter (e.g., detected color, tone, hue or tint or shade, and intensity, which may be defined in color space or otherwise) of a candidate "vegetation" pixel or voxel is compared against a reference color range (e.g., reference color range, tone range, hue, tint or shade range, and intensity range, which may be defined in color space or otherwise) for a particular crop or variety of crop to determine whether the candidate vegetation pixel or voxel qualifies as part of the vegetation canopy or not. The image processor 20 may execute such color comparisons or analysis in any color space, such as the RGB color space, YUV color space, or any other color space. The RGB color space allows red, green, and blue pixels to be combined additively to create other colors. In the YUV color space, Y represents the luminance component (e.g., brightness) and U and V are chrominance components. The U component represents a subtraction of the Y from the blue signal of the RGB signal, and V represents a subtraction of Y from the red signal of the RGB signal.

In step S102, an image processor 20 determines whether an object height of the object exceeds the vegetation height by a minimum threshold. The minimum threshold may be selected based upon the statistical variation or standard deviation of the ground level in a field, the statistical variation or standard deviation of a vegetation height in a field such that the highest points of the vegetation canopy or ground are not over-inclusively identified as objects or obstacles. The screening or filtering process of step S102 may be used to identify an object that has a material or significant height that may present an obstacle to the vehicle, as opposed to nuisance, an image artifact, or distortion and to efficiently use the processing resources of the image processor 20. If the object height of any object does not exceed the vegetation height (or top surface of the vegetation canopy) by more than a minimum threshold, the method continues with step S104. However, if the object height of any object does exceed the vegetation height (or the top surface) of the vegetation canopy by more than a minimum threshold, the method continues with step S106.

Step S102 is conducted in a stereo vision mode or any other three-dimensional technique that provides depth perception or depth estimation of the scene or obstacle.

In step S104, the image processor 20 or the obstacle detection module 26 may determine that no material obstacle is present in the volume above the vegetation height of the vegetation canopy. The finding of no material obstacle in step S104 may be subject to any qualifications based on sensor limitations, sensor specifications (e.g., sensor radiation pattern, field of view of the sensor, sensor sensitivity, or maximum reliable range) or other technical factors. For example, the volume above the vegetation canopy may be limited to the vertical field of view of the left imaging unit 10, the right imaging unit 12, or both.

In step S106, the object estimator 25 estimates range and dimensions associated with the screened object in accordance with a stereo vision data processing scheme. A screened object is an object that has an object height that exceeds a target height (e.g., vegetation height in accordance with the screening process of step S102) by a minimum threshold. A screened object has a material or significant height that may present an obstacle to the vehicle, as opposed to nuisance, an image artifact, ordistortion. Step S106 may be carried out in accordance with various techniques that may be applied alternately or cumulatively. Under a first technique, the object estimator 25 or image processor 20 estimates range and dimensions of an object in accordance with the procedure of FIG. 3. Under a second technique, the object estimator 25 or image processor 20 estimates range and dimensions of an object in accordance with the stereo imaging equations presented in conjunction with FIG. 4. The procedure of FIG. 3 and the equations presented in conjunction with FIG. 4 are described later herein, but such descriptions shall apply to FIG. 2 as if fully set forth in conjunction with step S106.

In an alternate embodiment for conducting step S106, the image processor 20 may estimate the range and dimensions of an object, by using field-of-focus processing instead of or in addition to the stereo vision data processing.

In step S107, the image processor 20 or classifier 29 classifies the object or obstacle based on the dimensions and compliance with a dimension reference profile. The image processor 20 or classifier 29 may facilitate the retrieval of dimension reference profiles from data storage, where such dimension reference profiles represent common obstacles, such as humans, animals, trees, bushes, machines, and vehicles. For example, a basic dimension reference profile might represent a range of expected height and a range of widths expected for humans, whereas a more complex reference profile might provide dimensions for a two dimensional or three dimensional expected side profile shape or an expected front profile shape.

In one embodiment, the dimension reference profile comprises one or more of the following: a height range and width range for a front human profile, a height range and width range for a side human profile, a height and width range for a front animal profile, a height and width range for a side animal profile, a height and width range for front of a machine, a height and width range for a side of a machine, a height and width range for a tree, a dimension range for a corresponding front outline of human, a dimension range for a corresponding side outline of a human, a dimension range for a corresponding front outline of an animal, dimension range for a front outline of a machine, dimension range for a side outline of a machine, and dimension range for a tree, a three dimensional model human profile, a three dimensional model animal profile, a three dimensional model tree profile, and a two-dimensional representation of an object associated with a uniform depth zone of a three dimensional representation of the object.

Step S107 may classify an observed object as compliant (e.g., matching) or non-compliant with a dimensional reference profile for a corresponding known object or object type. Step S107 works in conjunction with other steps of the method of FIG. 2, such as S96, S98, and S102, to identify reliably and accurately objects or obstacles in a field of view. Accordingly, step S107 contributes toward avoiding false positive and false negative determinations or observations of objects or obstacles that require evasive measures or changes to the candidate path plan 34 of the vehicle.

Figure 11:
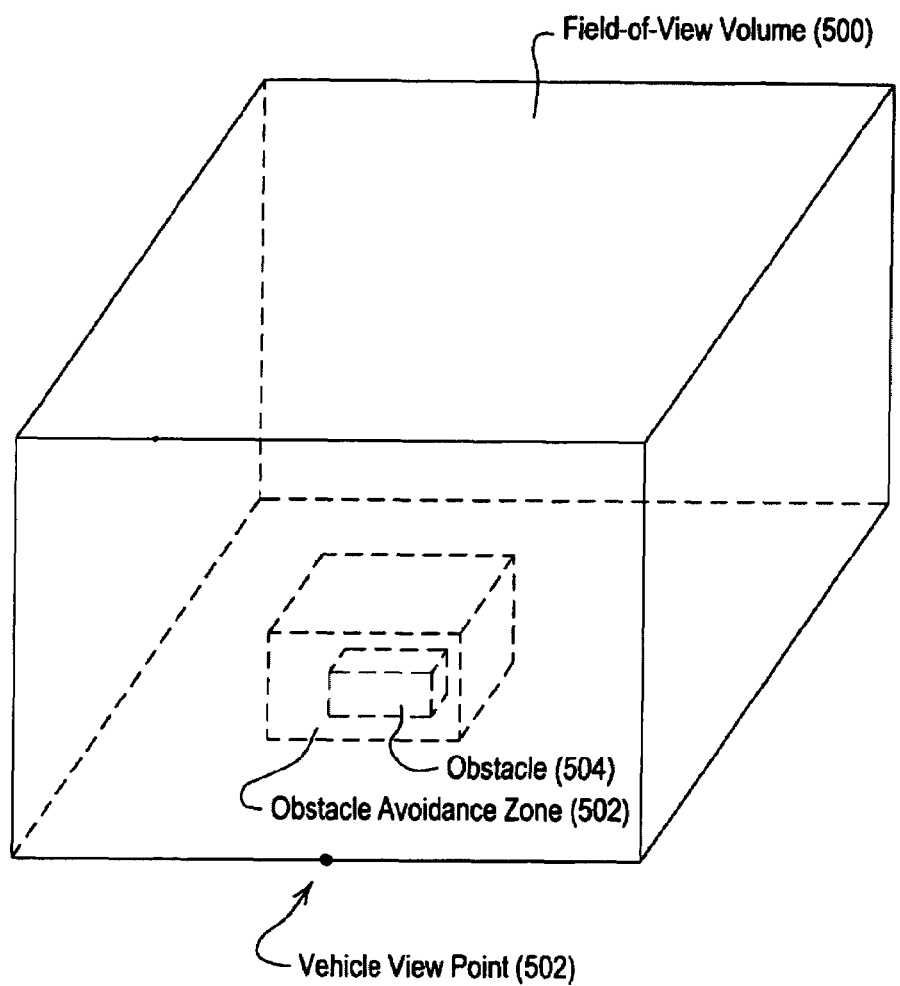
FIG. 11 is an example of a three dimensional obstacle avoidance zone in a field of view volume.

In step S108, an obstacle avoidance zone is established for the vehicle based on the estimated range and dimensions. For example, the path planner 35 may have a candidate path plan 34 that is updated to an obstacle-avoiding path plan 36 based on the estimated range and dimensions of the object or obstacle from step S106. The obstacle-avoiding path plan 36 is determined to avoid any possible collision between the object and the vehicle. If the object is stationary in the field of view of the image collection system 15, the image processor 20 may use a single frame or stereo image to provide sufficient information to avoid a collision. However, it is understood that if the object or obstacle is moving, the image processor 20 may need multiple frames or stereo images to identify the velocity (speed and direction) and acceleration or deceleration of such movement to effectively avoid a collision. FIG. 11 provides an illustrative example of three-dimensional obstacle avoidance zone and the description of FIG. 11 may be applied to step S108.

Figure 3:
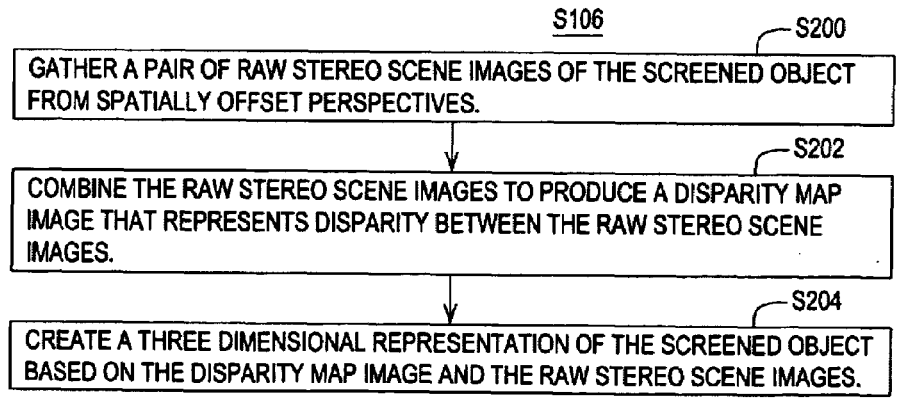
FIG. 3 is a flow chart that shows estimating of the range and dimensions of an object with stereo vision in greater detail than FIG. 2.
Figure 4:
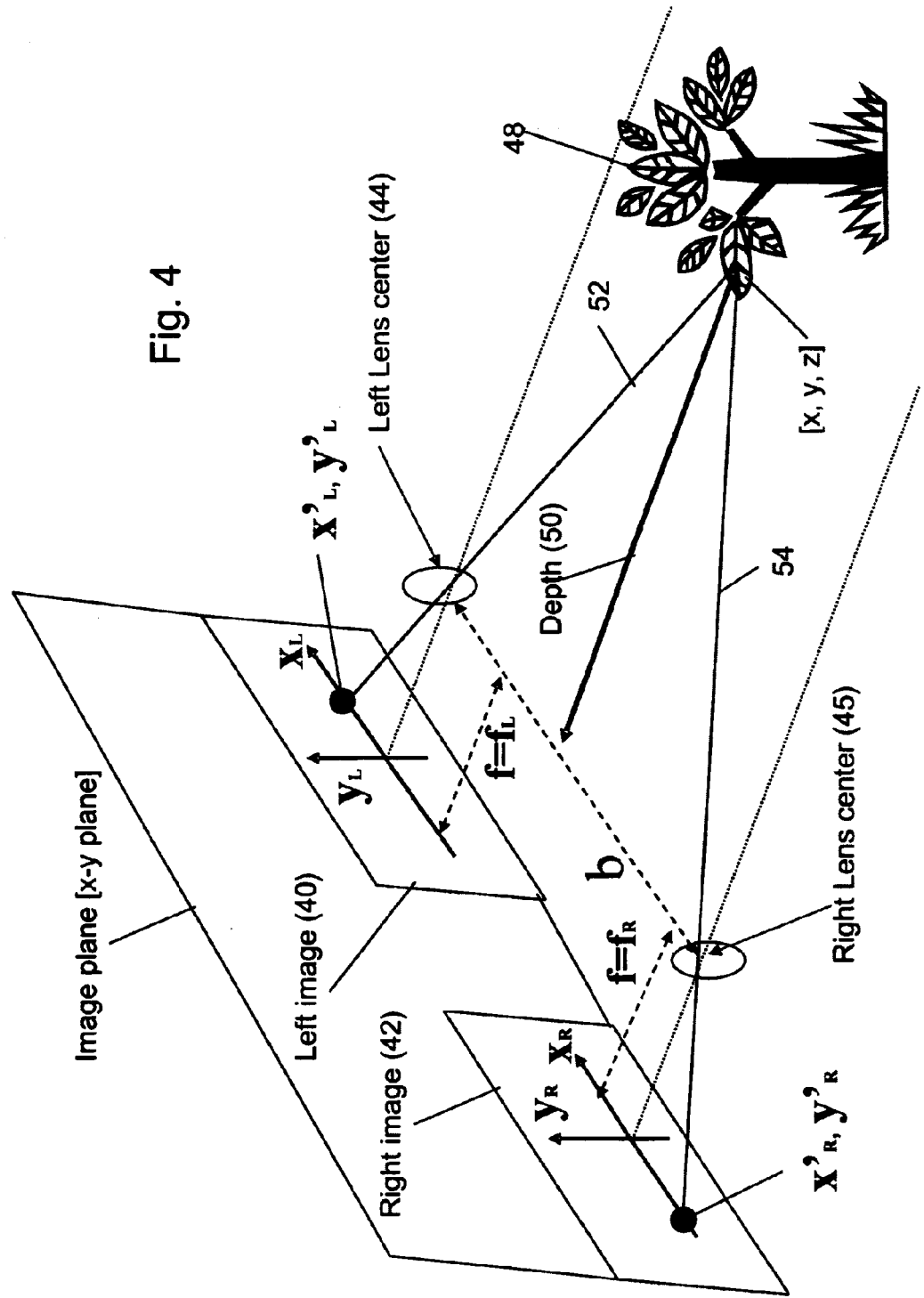
FIG. 4 shows a diagram that illustrates collection of stereo vision data and determination of three-dimensional world coordinates for an object in a scene.

FIG. 3 is a flow chart that shows one possible technique for carrying out the process or step S106 of FIG. 2 in greater detail. Step S106 may include steps S200, S202 and S204 as shown in FIG. 3. The process of FIG. 3 begins in step S200.

In step S200, the image collection system 15 gathers (e.g., simultaneously gathers) a pair of raw stereo scene images of the object from spatially offset perspectives. The spatially offset perspective is preferably one in which the focal axis of the first imaging unit 10 and the second imaging unit 12 are separated by a known distance and orientation (e.g., fixed linear distance called stereo baseline b in FIG. 4).

In step S202, an image disparity module 22 or image processor 20 combines raw stereo scene images to produce a disparity map that represents disparity between the raw stereo scene images collected in step S200. The raw stereo images may be expressed as or converted into greyscale images as inputs to the disparity module 22. The disparity module 22 uses a disparity algorithm (e.g., correlation of common points in each raw stereo image or a sum of absolute differences applied to such common points) to form a disparity map based on a spatial relationship between each point in one raw stereo image its corresponding point in the other stereo image. The disparity module creates a disparity map for each pixel in one of the raw stereo scene images. The disparity map may be stored as a single greyscale image or a monochrome image in which disparity is a function of x and y in one raw stereo scene image or d (x,y), for example.

Stereo disparity (d) is inversely proportional to the depth of an object. The stereo disparity (d) is defined as $d=bf/z$, where b is the stereo baseline, f is the focal length of the imaging units (10 and 12), and z is the depth of an object from the imaging units (10 and 12). The disparity map is a representation that facilitates the removal of some redundant data from the two raw stereo images collected in step S200.

In step S204, the three dimensional image former 23 or the image processor 20 creates a three-dimensional representation of the object or the scene based on the disparity map image and at least one of the raw stereo scene images gathered in step S200. In one example for carrying out step S204, the three dimensional image former 23 may accept an input of the disparity map, which has information about x,y,d for the scene or an object, and map the x,y,d information to x,y,z coordinates for the scene or any object in the scene.

In another example for carrying out step S204, the three dimensional image former 23 extracts the three-dimensional map from the disparity map and at least one of the raw stereo scene images through (a) application of the stereo vision equations discussed in more detail in FIG. 4 to estimate the three-dimensional real world coordinates of the object from one or more perspectives of the vehicle and (b) construction of a surface model of the object based on the estimate of three dimensional world coordinates.

The construction of the surface model may use a grid of voxels that generally defines the three-dimensional shape of an object to form interconnect the nearest neighbor points with linear segments or tangent planar grids, for example. Although greater resolution of the surface model of the object is useful for object classification or the application of pattern recognition techniques, the surface model can be crude t produce a rapid navigation solution for obstacle avoidance of objects and detection or objects that are in motion.

FIG. 4 is an illustration of a typical representation of how three-dimensional information on an object is extracted from an image collection system 15 that collects stereo vision images. A right lens center 45 and a left lens center 44 are associated with the right imaging unit 12 and the left imaging unit 10, respectively. The right lens center 45 and left lens center 44 may represent central regions of the lenses of the imaging units. A dashed reference line, labeled "b" for stereo baseline b, interconnects the right lens center 45 and the left lens center 44. The first imaging unit 10 and the second imaging unit 12 are separated by a distance associated with the stereo baseline (b). The optical axes of each imaging unit is perpendicular to the stereo base line. An object is shown as a plant 48 here and is separated from baseline b by a depth 50. A group of points on the plant 48 may be expressed as three dimensional information that define the shape, size, and spatial dimensions of the object or plant 48.

The three-dimensional information may be represented in a Cartesian coordinate system, a polar coordinate system, a spherical coordinate system, or otherwise. As illustrated in FIG. 4, the three dimensional information is expressed in accordance with Cartesian coordinates. For example, the three dimensional information may include coordinate values (e.g., x, y, z) for each point on the surface of the plant 48. As illustrated in FIG. 4, the three dimensional information is referenced to an x-y image plane generally parallel to base line b of the imaging units (10 and 12). A z-axis is perpendicular to or normal to the x-y image plane.

The left image 40 and the right image 42 lie in the image plane (i.e., the x-y plane) in FIG. 4. The left image 40 represents a view of the object (e.g., plant 48 and surrounding image) from the perspective of the left imaging unit 10, which includes the left lens center 44. The right image 42 represents a view of the object (e.g., plant 48 and surrounding image) from the perspective of the right imaging unit 12, which includes the right lens center 45. The right image 42 lies behind the right lens center 45 by a focal length, designated $f_r$; the left image 40 lies behind the left lens center 44 by a focal length designated $f_l$. A left image coordinate system is defined on the left image plane as $x_l$, $y_l$. A right image coordinate system is defined n the right image plane, as $x_r$, $y_r$.

The three dimensional world coordinates of a point in a scene or on an object in the scene are as follows:

$$x = \frac{b(x'_l - x'_r)}{2d},$$

$$y = \frac{b(y'_l - y'_r)}{2d}, \text{ and}$$

$$z = \frac{bf}{d}$$

where b is the stereo baseline distance between the optical centers of the two imaging units, d is the disparity, which is $x'_l - x'_r$, and f is the effective focal length of the imaging units for the case where $f = f_r = f_l$, $x'_l$ is the $x_l$ coordinate on the left image of the image plane corresponding to the point on the object, $y'_l$ is $y_l$ coordinate on the coordinate on the left image plane, $x'_r$ is the $x_r$ coordinate on the right image of the image plane corresponding to the point on the object, and $y'_r$ is $y_r$ coordinate on the coordinate on the right image plane. The z dimension is synonymous with the depth of a point on the object.

Figure 5:
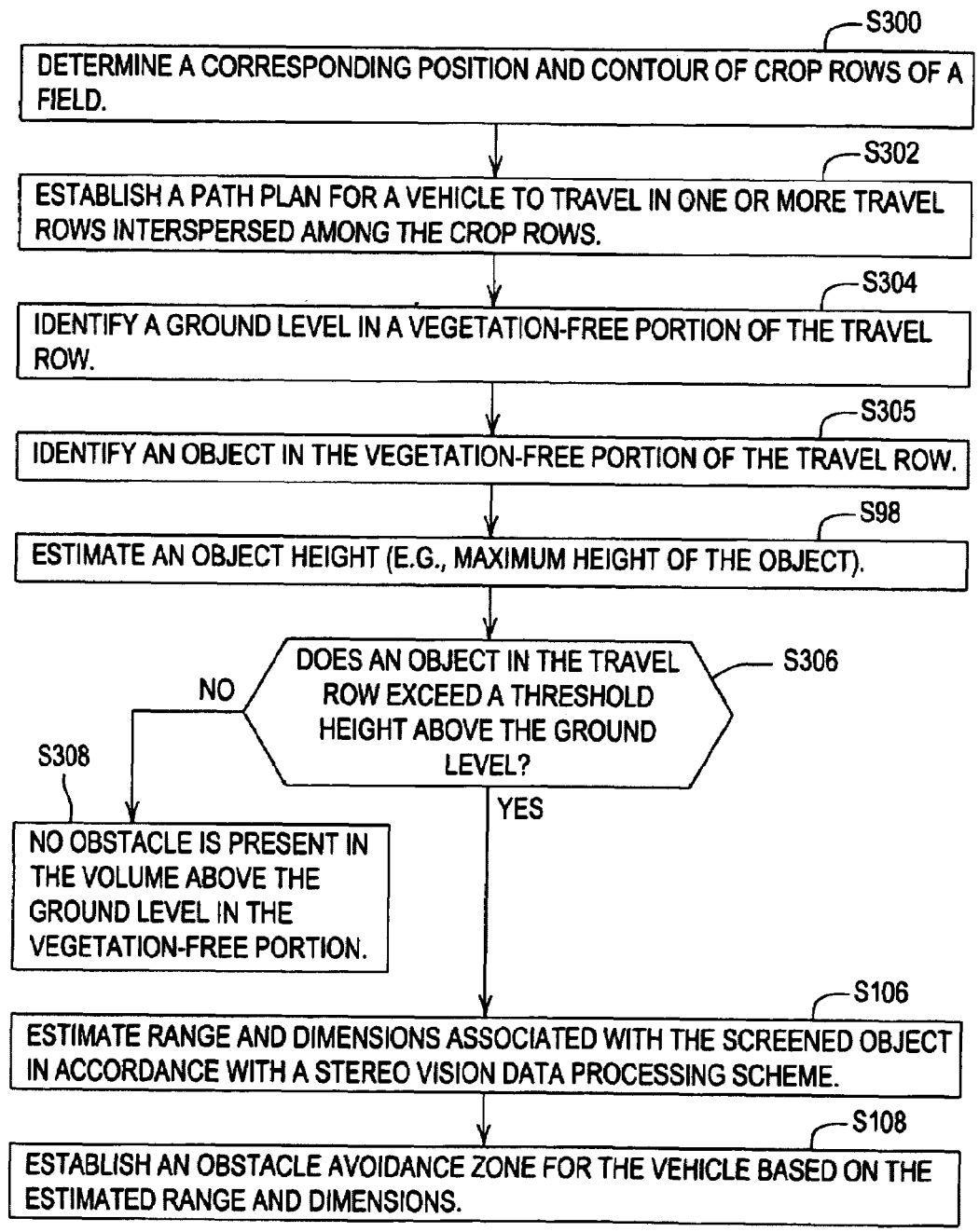
FIG. 5 is a flow chart of another embodiment of a method for detecting an obstacle.

The above equations may be applied repeatedly as a vehicle equipped with the obstacle detection system 11 moves throughout a work area or its environment to capture a group of stereo scene images on one or more objects from different perspectives. As a vehicle moves additional stereo images may be used to extract further three-dimensional information on the same object. Accordingly, a three-dimensional reconstruction of the dimensions and range of object may be based on three dimensional image points calculated from different perspective locations of the vehicle and registered to a common reference or coordinate system with respect on one another. Registration of different stereo images taken from different positions may be accomplished by selecting portions of the scenes and matching for luminance or intensity of the pixels or voxels. Corresponding luminance values, and color values (e.g., in RGB color space, or otherwise) may be associated with each data point to form a voxel or another multidimensional representation FIG. 5 is a flow chart of a method for detecting an obstacle. The method of FIG. 5 begins in step S300.

In step S300, a row detection module 28 or image processor 20 determines a corresponding position and contour of crop rows of a field. In one example for carrying out step S300, a disparity module 22 or image processor 20 may create a disparity map that can be used to identify the position and contour of crop rows in a field. In another example for carrying out step S300, a three dimensional image former 23 or the image processor 20 forms a graphical, mathematical, tabular, or database representation of the position and contour of the crop rows in the field.

In step S302, a path planner 35 establishes a path plan for a vehicle to travel in one or more travel rows interspersed among the crop rows. The defined crop rows of step S300 may form spatial boundaries for the travel rows.

In step S304, an image processor 20 identifies a ground level in a vegetation-free portion of the travel row. For example, the pattern recognition module 21 or image processor 20 may compare pixels or voxels in color space to determine whether a vegetation-free portion of the travel row is visible or present. One or more images (e.g., stereo vision data) of soil color parameters may be compared to reference soil color ranges to determine whether a vegetation-free portion of the travel row is visible or present.

In step S305, the obstacle detection module 26 or image processor 20 identifies an object in the vegetation-free portion of the travel row. For example, an image processor 20 or obstacle detection module 26 identifies an object in the vegetation-free portion of the travel row by analyzing one or more images in color space. The object is extracted from or distinguished from the background of the image in color space by applying one or more of the following techniques to the image or a portion of an image: color differentiation, color histogram analysis, probability density function analysis, and edge analysis in an image region within the boundaries of the object and immediately outside the boundaries of the object. In one embodiment, to differentiate obstacles from the background of the image or scene, the obstacle detection module 26 may apply a data processing resources of the image processor 20 first to a candidate path plan of the vehicle and a safety clearance zone about the vehicle or such candidate path plan, and secondarily to the entire field of view of the image collection system 15.

In step S305, a collected derivative data set of the collected image is compared to a reference derivative data set of a reference image. In one embodiment, the collected derivative data set may represent a probability density function or a color histogram analysis applied to a collected image or a portion thereof. For example, the reference derivative data set of a reference image is defined as a probability density function of color parameters (e.g., color, tone, hue, or intensity) or color histogram of color parameters derived from a reference image that may be collected from the obstacle-free, vegetation free portion of the travel row in question with a substantially similar color palette or presence of a particular crop (e.g., corn or soybeans) at a particular growth stage (e.g., early season, mid-season, or mature-harvest time) with defined illumination characteristics (e.g., full sun, partly cloudy, overcast). The particular crop type, growth stage, and defined illumination characteristics of the reference image are preferably substantially similar to those applicable to the obstacle-free, vegetation free portion of the travel row at the collection time of the images.

In step S98, an image processor 20 or object estimator 25 estimates an object height (e.g., a maximum height of the object). Step 98 was previously described in conjunction with FIG. 2 and such description applies equally to FIG. 5.

In step S306, an image processor 20 or object estimator 25 determines if an object in the travel row exceeds a threshold height above the ground level. For example, the image processor 20 or the object estimator 25 determines if the object exceeds a threshold height above the ground level through a stereo vision mode. In one embodiment, the image processor 20 or image disparity module 22 determines depth information for an object by reading a disparity image or by correlation between points on stereo images. The height information (e.g., actual or real world height) is obtained from the object in at least one of the raw stereo images (or stereo vision data) with reference to its depth.

If the object in the travel row exceeds a threshold height, then the method continues with step S106. However, if the object in the travel row does not exceed the threshold height, the method ends in step S308. In step S308, the image processor 20 determines that no obstacle or object is present in the volume above the ground level in the vegetation-free portion.

In step S106, an object estimator 25 estimates a range and dimensions associated with the object. Step S106 may be executed as described in accordance with the method of FIG. 2, FIG. 3 or the equations of FIG. 4 as previously described.

In step S108, the vehicular guidance system 32 or path planner 35 estimates an obstacle avoidance zone for the vehicle based on the estimated range and dimensions. Like reference numbers in FIG. 2 and FIG. 5 indicate like procedures or steps.

Figure 6:
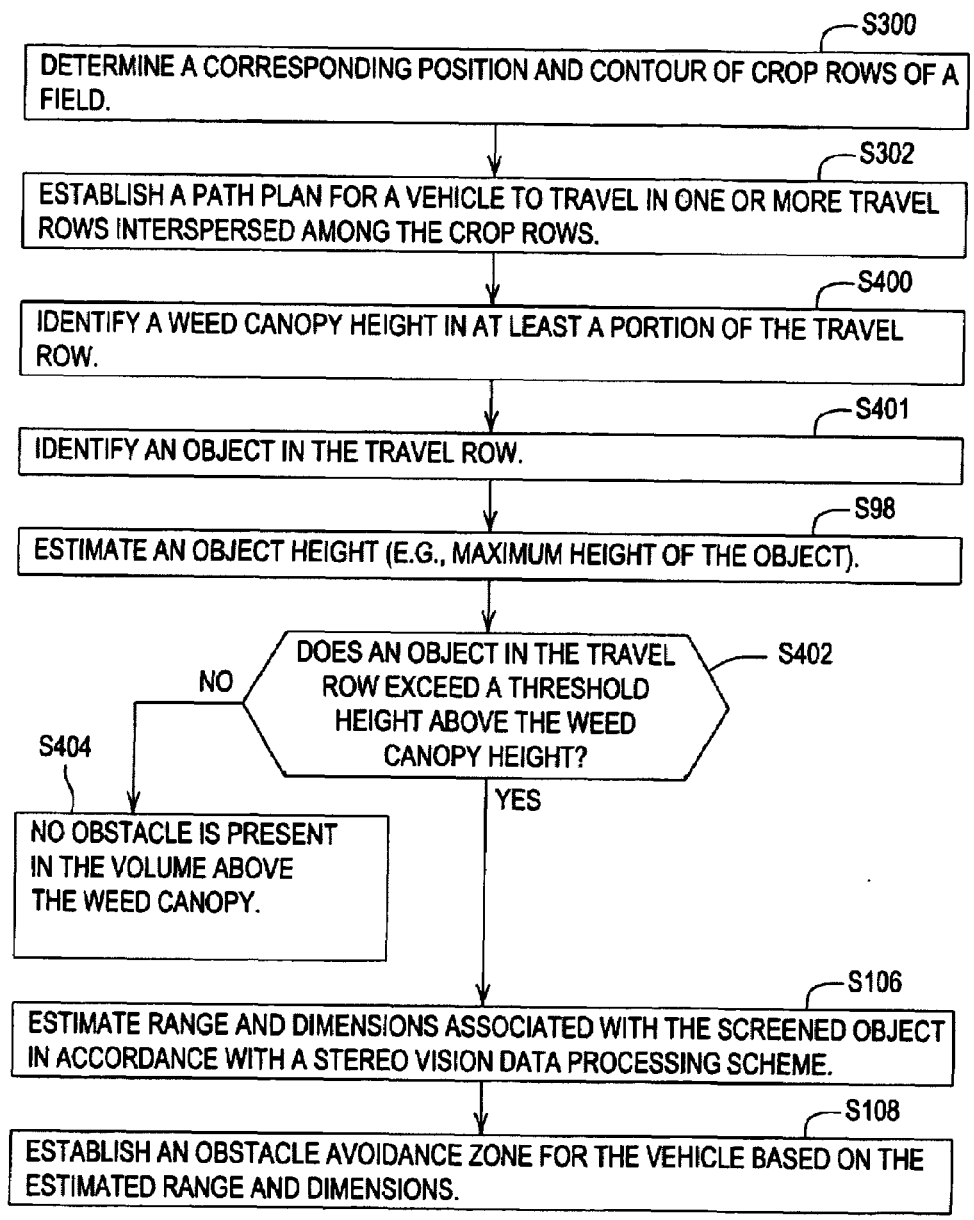
FIG. 6 is a flow chart of yet another embodiment of a method for detecting an obstacle.

The method of FIG. 6 is similar to the method of FIG. 5, except the method of FIG. 6 replaces steps S304, S305, S306 and S308 with corresponding steps S400, S401, S402, and S404. Like reference numbers in FIG. 5 and FIG. 6 indicate like elements.

Steps S300 and S302 have already been described in conjunction with FIG. 5 and apply equally here to FIG. 6. Step S400 follows step S302.

In step S400, the image processor 20 identifies a weed canopy height in at least a portion of the travel row. The same techniques in step S100 of FIG. 2 that apply to the determining the vegetation height of the vegetation canopy apply of step to step S400 here, except that the row detection module 28 is used as a mask to digitally or virtually remove portions of the vegetation that lie within crop rows and are likely to be crops. Step S400 may also apply the pattern recognition module 21 or image processor 20 to conduct color differentiation in color space of pixels (or voxels) between the crop rows to determine if the vegetation color, shape, or dimensions are more consistent with the known vegetation color, shape or dimensional attributes of the crop, or weeds.

In step S401, the image processor 20 or obstacle detection module 26 identifies an object in a weedy portion of the travel row. For example, the pattern recognition module 21 or image processor 20 may compare pixels or voxels in color space to determine whether an object in weedy portion of the travel row is visible or present. One or more images (e.g., stereo vision data) in the weedy portion of the travel row may be compared to reference weed color ranges to determine whether an object is present in a weedy portion of the travel row.

In step S98, the image processor 20 or object estimator 25 estimates an object height (e.g., maximum height of the object.) Step 98 was previously described in conjunction with FIG. 2 and such description applies equally to FIG. 5.

In step S402, the image processor 20 determines if an object in the travel row exceeds a threshold height above the weed canopy height. The image processor 20 may be programmed and trained to recognize weed types by one or more of the following: color, appearance, and height range. For example, height ranges may be associated with different weed types comprising the weed canopy. If an object in the travel row exceeds a threshold height above the weed canopy height, the method continues in step S106. However, if the object in the travel row does not exceed a threshold height above the weed canopy height, the method continues in step S404.

In step S404, the image processor 20 determines that no obstacle is present in the volume above the weed canopy.

In step S106, the image processor 20 or object estimator 25 estimates a range and dimensions associated with an object. Following step S106, step S108 is executed. Steps S106 and S108 were already described in conjunction with FIG. 2 and such discussion applies with equal force to the method of FIG. 6.

Figure 7A:
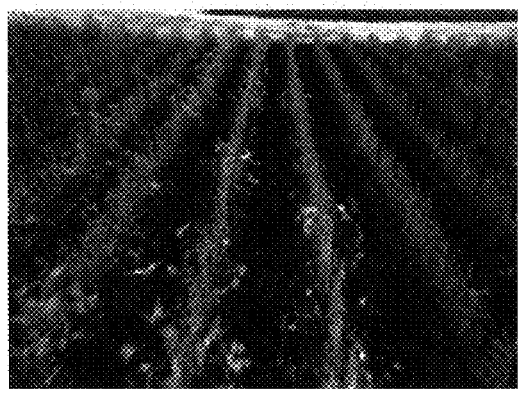
FIG. 7A and FIG. 7B are images of raw scene information for a common scene from two different perspectives.
Figure 7B:
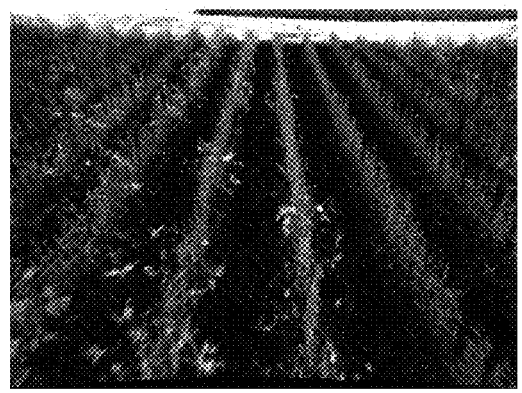

FIG. 7A and FIG. 7B provide a typical representation of the collection of three-dimensional information. FIG. 7A is left image of a stereo pair and FIG. 7B is a right image of a stereo pair. The left image and the right image show a common scene at a generally simultaneous time and are separated by a known spatial distance. Although the scene may include any environment in which a vehicle (equipped with an obstacle detection system 11) may travel or be present, the scene shown in FIG. 7A and FIG. 7B is that of a corn field during mid season. FIG. 7 A and FIG. 7B are representative of an illustrative example of step S200 of FIG. 3.

Figure 8:
FIG. 8 is a depiction of disparity data extracted from the raw scene information of FIG. 7A and FIG. 7B.

FIG. 8 is a graphical representation of a disparity map that represents various disparities in the left and right images (of FIG. 7A and FIG. 7B) as shades of green color. The disparity map of FIG. 8 may be produced by processing the data from the left image and the right image of FIG. 7A and FIG. 7B as described in step S202 of FIG. 3, for example. Any shade of color could be used to represent the disparity and a greyscale might be used under circumstances where resolution permits.

In FIG. 8, the brighter the intensity represents the larger disparities and objects that are closer. The disparity decreases with distance away from the left imaging unit 10 and right imaging unit 12. As can been seen in the disparity image below, linear regions of higher disparity depict a row structure representative of row crops. Lower disparity regions are present between adjacent rows and are darker. Accordingly, the differential disparity of different pixels in the image can be used to extract row positions of row crops. The linear regions of the higher disparity may be used by the row detection module 28 to identify crop rows from stereo vision data. For instance, the linear regions of higher disparity might be applied to step S300 of FIG. 5 to determine the position and contour of crop rows in a field.

Figure 9:
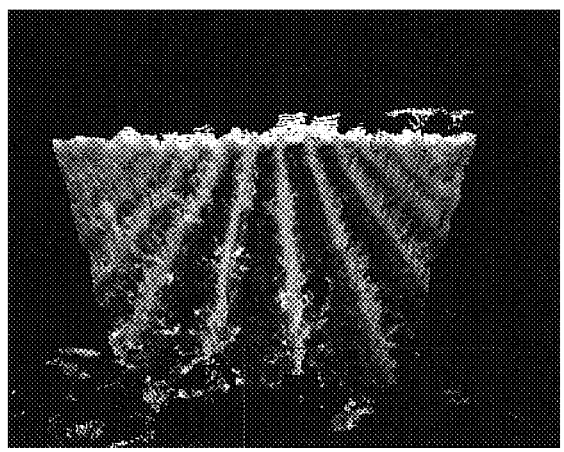
FIG. 9 is three dimensional image of an illustrative scene generated at least partially from the disparity data of FIG. 8.

FIG. 9 shows a three-dimensional representation of the scene which may be produced from the disparity map of FIG. 8. The three-dimensional representation gives an X-Y-Z representation in Cartesian coordinates relative to the camera coordinate system. The coordinate system is determined in a calibration process. The three dimensional representation of FIG. 9 might be produced by application of the procedure described in step S204 of FIG. 3, for example.

The pattern recognition module 21 may apply pattern recognition to two dimensional image data, three dimensional image data, monocular vision data, or stereo vision data identify or isolate an object in a scene in any of the methods or embodiments discussed in this document. In particular, the pattern recognition module 21 may be applied effectively to a three-dimensional representation (e.g., the three dimensional representation of FIG. 9). For example, the pattern recognition module 21 may apply pattern recognition after the dimensions and range of an object are determined. In one embodiment, the image processor 20 or pattern recognition module 21 performs image processing on the three-dimensional representation of the scenes to classify scene characteristics for a vehicular guidance system 32. The three dimensional representation may be expressed as a series of two dimensional images (e.g., slices) that are stacked in memory or data storage and separated by known distances representative of a sampled real-world volume. The object may be classified into a classification (e.g., human being, vehicle, tree, rock, boulder, machine, telephone pole, tower or building) in accordance with rules that define the dimensions and shape of the object.

For simplification, consider the case where the x-coordinate of the scene are to the right from the camera, y-coordinate forward and z-coordinate upward. Furthermore, the ground plane in front of the vehicle is known to be at z=0. Also, crop vegetation planted in rows in the ground plane at a row spacing of 30 inches and the crop canopy is soybeans that reaches a maximum height of 24 inches. In this case, row-crop guidance information can be based on image processing in the coordinate system volume containing the crop. With appropriate image processing, the three dimensional voxels representing vegetation could be used to assess soybean canopy growth and development from the beginning of the season to the period of maximum growth. Obstacle detection occurs when there are objects that appear in the same scene that violate one or more measures of expectation of the crop canopy. For example, any object that stands out above the volume of expected crop growth would be a potential obstacle. With more advanced pattern recognition, the stereo images can be used to extract and label the scene characteristics.

Figure 10:
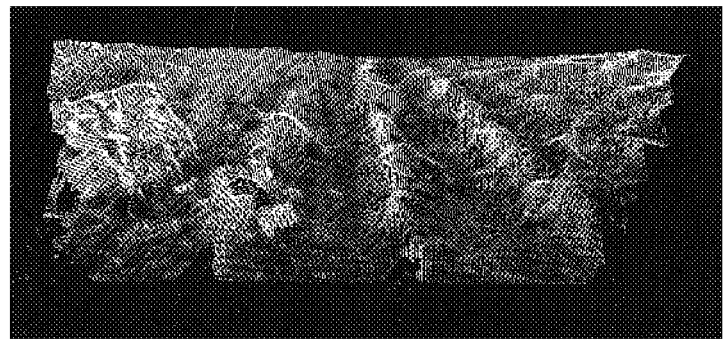
FIG. 10 is a three dimensional image of an illustrative scene generated at least partially from the disparity data of FIG. 8.

FIG. 10 is another representation of the three dimensional cloud data that shows the ground surface and crop row features. FIG. 10 may be viewed as an alternate three-dimensional to representation of FIG. 9. The image processor 20 may process any three-dimensional representation disclosed hereunder, including those of FIG. 9 or FIG. 10, as described in conjunction with FIG. 9 or otherwise.

FIG. 11 is an illustrative graphical representation of a field-of-view volume 500 that contains an obstacle avoidance zone 506. A vehicle equipped with a obstacle detection system 11 may be situated at the vehicle point of view 502 facing inward, upward as illustrated in FIG. 11. The obstacle avoidance zone 506 is equal to or greater than the obstacle size and obstacle dimensions 504. Although the obstacle avoidance zone 506 may be coextensive with the three dimensional data points that define the physical shape and size of the obstacle, such an obstacle avoidance zone 506 may only reflect the instantaneous position of the obstacle and may need to be updated based on one or more of the following: obstacle path, obstacle heading, obstacle acceleration, obstacle velocity, and obstacle speed. Further, the obstacle avoidance zone 506 may be expanded to represent a greater volume about the physical obstacle to represent uncertainty in the stereo vision modeling or perception of dimensions, unexpected movements of the obstacle, or the like. In practice, the graphical representation of FIG. 11 may be expressed in Cartesian, polar, or spherical coordinates, in two or three dimensions. The graphical representation could be expressed in tabular format or in a database or as linear or curve equations.

The system and method disclosed herein overcomes certain limitations of monocular vision for machine perception; particularly, when applied to vehicle navigation and obstacle detection. First, stereovision is more illumination tolerant than approaches based on monocular vision. Second, stereovision is more insensitive to the effects of the growth and development of crops. Plant vegetation height creates perspective effects on monocular vision due to the uncertainty of range. The stereo pair recovers range information to remove this problem.

Third, monocular vision has not proven useful for obstacle detection except to look for image features that violate the expected scene information (e.g., look for objects that are not classified as a crop or classified as soil). Range information provided by stereovision can provide the additional dimensionality to allow for identification of obstacles based on size, shape, and other three dimensional geometric characteristics. Accordingly, the system and method of this invention facilitates a general-purpose perception sensor for vehicle guidance and navigation that is not possible with a monocular imaging system.

Having described the preferred embodiment, it will become apparent that various modifications can be made without departing from the scope of the invention as defined in the accompanying claims.

I claim:

1. A method for detecting an obstacle, the method comprising:
   identifying an object in a field by analyzing one or more stereo images in color space;
   determining a vegetation height of a cultivated vegetation canopy at corresponding coordinates within the field;
   detecting an object height of the object to identify a screened object having an object height exceeding a vegetation height of the cultivated vegetation canopy;
   estimating a range associated with the screened object with respect to a vehicle;
   estimating dimensions associated with the screened object; and
   establishing an obstacle avoidance zone for the vehicle based on the estimated range and dimensions.

2. The method according to claim 1 further comprising:
   classifying the screened object based on the dimensions and compliance with a dimension reference profile.

3. The method according to claim 2 further wherein the dimension reference profile comprises one or more of the following: a height range and width range for a front human profile, a height range and width range for a side human profile, a height and width range for a front animal profile, a height and width range for a side animal profile, a height and width range for front of a machine, a height and width range for a side of a machine, a height and width range for a tree, a dimension range for a corresponding front outline of human, a dimension range for a corresponding side outline of a human, a dimension range for a corresponding front outline of an animal, dimension range for a front outline of a machine, dimension range for a side outline of a machine, and dimension range for a tree, a three dimensional model human profile, a three dimensional model animal profile, a three dimensional model tree profile, and a two-dimensional representation of an object associated with a uniform depth zone of a three dimensional representation of the object.

4. The method according to claim 1 wherein the identifying of the object first analyzes a zone associated with a candidate path plan and secondarily analyzes a remainder of a field of view of the image.

5. The method according to claim 1 further comprising:
   collecting image data associated with at least one of the field and the object;
   deriving a derivative data set of image data based on the collected image data;
   establishing reference image data associated with a reference image representative of the field;
   deriving a reference derivative data set based on the established reference image data;
   comparing the derivative data set to the reference derivative data set to determine a region of the collected image data that is distinct from the reference image and indicative of the potential presence of an object in the field.

6. The method according to claim 5 wherein the reference image data is collected in an obstacle-free portion of a field.

7. The method according to claim 6 wherein establishing of the reference image comprises collecting the reference image for a particular crop at a particular growth stage with defined illumination characteristics substantially similar to those applicable to the field.

8. The method according to claim 1 wherein the determining of the vegetation height comprises determining the vegetation height of a crop row canopy as the vegetation canopy.

9. The method according to claim 1 wherein the determining of the vegetation height comprises determining the vegetation height of a weed canopy as a vegetation canopy.

10. The method according to claim 1 wherein estimating of the range is based on depth data of the object, where the depth data is derived from at least one of stereo vision data and a disparity map.

11. The method according to claim 1 wherein the estimating of the range and the dimensions comprises:
    gathering a pair of raw stereo scene images of the object from spatially offset perspectives;
    combining the raw stereo scene images to produce a disparity map image that represents disparity between the raw stereo scene images; and
    creating a three dimensional representation of the object based on at least one of the disparity map image and the raw stereo scene images.

12. The method according to claim 1 wherein the estimating of the dimensions is based on the estimated range and at least one stereo image.

13. The method according to claim 1 further comprising:
    determining a corresponding position and contour of crop rows defining the vegetation canopy of a field.

14. The method according to claim 13 further comprising:
    establishing a path plan for a vehicle to travel in one or more travel rows interspersed among the crop rows.

15. The method according to claim 1 wherein the determining of the vegetation height of the vegetation canopy further comprises determining a corresponding position and contour of crop rows in the field.

16. A system for detecting an obstacle, the system comprising:
    a row detection module for determining a vegetation height of a cultivated vegetation canopy at corresponding coordinates within a field;
    an obstacle detection module for detecting a screened object with an object height that exceeds the vegetation height of the cultivated vegetation canopy;
    an object estimator for estimating a range associated with the screened object with respect to a vehicle and estimating dimensions associated with the object via one or more stereo images; and
    a vehicular guidance system for establishing an obstacle avoidance zone for the vehicle based on the estimated range and dimensions.

17. The system according to claim 16 further comprising:
    a left imaging unit and right imaging unit for gathering a pair of raw stereo scene images of the object from spatially offset perspectives;
    a disparity map module for forming a disparity map image that represents disparity between the raw stereo scene images; and
    a three dimensional image former for creating a three dimensional representation of the object based on the disparity map image and at least one of the raw stereo scene images.

18. The system according to claim 17 wherein the obstacle detection module is arranged to first analyzes a zone associated with a candidate path plan and secondarily analyze a remainder of a field of view of the left imaging unit and the right imaging unit.

19. The system according to claim 16 further comprising:
    a classifier for classifying the object based on the dimensions and compliance with a dimension reference profile.

20. The system according to claim 19 further wherein the dimension reference profile comprises one or more of the following: a height range and width range for a front human profile, a height range and width range for a side human profile, a height and width range for a front animal profile, a height and width range for a side animal profile, a height and width range for front of a machine, a height and width range for a side of a machine, a height and width range for a tree, a dimension range for a corresponding front outline of human, a dimension range for a corresponding side outline of a human, a dimension range for a corresponding front outline of an animal, dimension range for a front outline of a machine, dimension range for a side outline of a machine, and dimension range for a tree, a three dimensional model human profile, a three dimensional model animal profile, a three dimensional model tree profile, and a two-dimensional representation of an object associated with a uniform depth zone of a three dimensional representation of the object.

21. The system according to claim 16 wherein the obstacle detection module compares collected derivative data set of image data to a reference derivative data set to determine a region of the collected image data that is distinct from the reference image and indicative of the potential presence of an object.

22. The system according to claim 21 wherein the reference image is collected in an obstacle-free portion of a field.

23. The system according to claim 16 wherein the vegetation height comprises a height of a crop row canopy as the vegetation canopy.

24. The system according to claim 16 wherein the vegetation height comprises a height of a weed canopy as the vegetation canopy.

25. The system according to claim 16 wherein the range is based on depth data of the object, where the depth data is derived from at least one of stereo vision data and a disparity map.

26. The system according to claim 25 further comprising:
 a crop row detection module for determining a corresponding position and contour of crop rows of the field based on the disparity map.

27. The system according to claim 16 wherein the object estimator estimates the dimensions and range ob art abject based on the estimated range and at least one stereo image.

28. The system according to claim 27 further comprising:
 a path planner for establishing a path plan for a vehicle consistent with the obstacle avoidance zone.

* * * * *